United States Patent
Plank et al.

(10) Patent No.: US 8,167,537 B1
(45) Date of Patent: May 1, 2012

(54) AIR COOLED TURBINE AIRFOIL WITH SEQUENTIAL IMPINGEMENT COOLING

(75) Inventors: William L. Plank, Tequestra, FL (US); James P. Downs, Jupiter, FL (US); John A. Fedock, Port St. Lucie, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 13/298,379

(22) Filed: Nov. 17, 2011

Related U.S. Application Data

(63) Continuation-in-part of application No. 12/351,624, filed on Jan. 9, 2009, now Pat. No. 8,096,766.

(51) Int. Cl.
| | |
|---|---|
| F03B 11/00 | (2006.01) |
| F01D 5/14 | (2006.01) |
| F01D 5/08 | (2006.01) |
| F01D 5/20 | (2006.01) |
| F03D 11/00 | (2006.01) |
| F04D 29/38 | (2006.01) |

(52) U.S. Cl. ..................... 415/115; 416/97 R
(58) Field of Classification Search .................. 415/115; 416/97 R
See application file for complete search history.

(56) References Cited

U.S. PATENT DOCUMENTS

| | | | | |
|---|---|---|---|---|
| 782,851 A * | 2/1905 | Hutchens | ......................... | 278/49 |
| 3,163,397 A * | 12/1964 | Gassmann et al. | ......... | 415/208.1 |
| 3,378,228 A * | 4/1968 | Davies et al. | .................. | 416/95 |
| 3,778,183 A * | 12/1973 | Luscher et al. | ................ | 415/115 |
| 4,183,716 A * | 1/1980 | Takahara et al. | ............. | 416/96 A |
| 6,120,244 A * | 9/2000 | Fukura | ........................... | 415/115 |
| 6,238,182 B1 * | 5/2001 | Mayer | ........................... | 416/96 A |
| 6,742,984 B1 * | 6/2004 | Itzel et al. | ...................... | 415/115 |
| 6,742,991 B2 * | 6/2004 | Soechting et al. | ............ | 416/97 R |
| 7,153,096 B2 * | 12/2006 | Thompson et al. | ............ | 415/200 |
| 7,198,458 B2 * | 4/2007 | Thompson | ..................... | 415/115 |
| 7,247,002 B2 * | 7/2007 | Albrecht et al. | ............... | 416/224 |
| 7,255,535 B2 * | 8/2007 | Albrecht et al. | ............... | 416/97 R |
| 7,862,299 B1 * | 1/2011 | Liang | ........................... | 416/97 R |
| 2003/0026689 A1 * | 2/2003 | Burdgick et al. | ............. | 415/115 |
| 2005/0087584 A1 * | 4/2005 | Abdo et al. | .................. | 228/173.1 |
| 2006/0177309 A1 * | 8/2006 | Synnott et al. | ............... | 416/97 R |
| 2007/0029369 A1 * | 2/2007 | Watkins et al. | ................ | 228/183 |
| 2009/0049794 A1 * | 2/2009 | Barone et al. | ............... | 52/745.21 |
| 2011/0123351 A1 * | 5/2011 | Hada et al. | ................... | 416/97 R |
| 2011/0236178 A1 * | 9/2011 | Devore et al. | ..................... | 415/1 |

* cited by examiner

*Primary Examiner* — David Zarneke
(74) *Attorney, Agent, or Firm* — John Ryznic

(57) ABSTRACT

An air cooled turbine airfoil such as a stator vane in which the airfoil is hollowed out and an insert is secured within the hollowed out section that produces sequential impingement cooling of the airfoil. The insert is formed from a plurality of plates bonded together outside of or inside of the airfoil to form a single piece insert with the cooling circuit. The plates are bonded together using TLP bonding process with sheets of boron placed between adjacent plates so that no excess material seeps out and into the cooling features formed with the plates. The cooling features of the plates are formed by photo-etching.

21 Claims, 10 Drawing Sheets

AIR COOLED TURBINE AIRFOIL WITH SEQUENTIAL IMPINGEMENT COOLING

CROSS-REFERENCE TO RELATED APPLICATIONS

This application is a CONTINUATION-IN-PART of U.S. patent application Ser. No. 12/351,624 filed on Jan. 9, 2009 and entitled AIR COOLED TURBINE AIRFOIL WITH SEQUENTIAL COOLING.

FEDERAL RESEARCH STATEMENT

None.

BACKGROUND OF THE INVENTION

1. Field of the Invention

The present invention relates generally to a gas turbine engine, and more specifically to an air cooled turbine airfoil.

2. Description of the Related Art Including Information Disclosed Under 37 CFR 1.97 and 1.98

In a gas turbine engine, air is first compressed to a high pressure in a compressor. The high pressure air is then mixed with fuel and burned at nearly constant pressure in the combustor. The high temperature gas exhausted from the combustor is then expanded through a turbine which then drives the compressor. If executed correctly, the exhaust stream from the turbine maintains sufficient energy to provide useful work by forming a jet, such as in aircraft jet propulsion or through expansion in another turbine which may then be used to drive a generator like those used in electrical power generation. The efficiency and power output from these machines will depend on many factors including the size, pressure and temperature levels achieved and an agglomeration of the efficiency levels achieved by each of the individual components.

Current turbine components are cooled by circulating relatively cool air (relative to the hot gas stream passing through the turbine), which is extracted from the compressor, within passages located inside the component to provide a convective cooling effect. In many recent arrangements, the spent cooling flow is discharged onto the surfaces of the component to provide an additional film cooling effect.

The challenge to cool first stage turbine vanes (these are exposed to the highest temperature gas flow), in particular, is complicated by the fact that the pressure differential between the vane cooling air and the hot gas which flows around the airfoil must necessarily be small to achieve high efficiency. Specifically, coolant for the first stage turbine vane is derived from the compressor discharge, while the hot gas is derived from the combustor exit flow stream. The pressure differential available for cooling is then defined by the extremely small pressure drop which occurs in the combustor. This is because the pressure of the coolant supplied to the vane is only marginally higher than the pressure of the hot gas flowing around the airfoil as defined by the combustor pressure loss, which is desirably small. This pressure drop is commonly on the order of only a few percentage points. Further, it is desirable to maintain coolant pressure inside the vane higher than the pressure in the hot gas flow path to insure coolant will always flow out of the vane and not into the vane. Conversely, in the event hot gas is permitted to flow into the vane, serious material damage can result as the materials are heated beyond their capabilities and progression to failure will be swift. As a consequence, current first stage turbine vanes are typically cooled using a combination of internal convection heat transfer using single impingement at very low pressure ratio, while spent coolant is ejected onto the airfoil surface to provide film cooling.

The efficiency of the convective cooling system is measured by the amount of coolant heat-up divided by the theoretical heat-up possible. In the limits, little coolant heat-up reflects low cooling efficiency while heating the coolant to the temperature of the surface to be cooled (a theoretical maximum) yields 100% cooling efficiency. In the previous methods using single impingement, the flow could only be used once to impinge on the surface to be cooled. This restriction precludes the ability to heat the coolant substantially, thereby limiting the cooling efficiency.

Designers and operators of gas turbine engines are always looking for ways to improve the performance of the engines. For example, an industrial gas turbine engine is operated by a power company to produce electricity. To improve the performance of the first stage turbine stator vane, additional cooling air can be provided to the vane to produce better cooling, or additional film cooling holes can be drilled into the vane to provide more film cooling for specific surfaces of the vane. This requires more cooling air from the compressor and therefore does not provide much of an improvement.

Another way to improve the performance of a turbine first stage stator vane is to redesign the internal cooling circuit and then cast a new stator vane with the redesigned cooling circuit. The new vane is then placed in the engine and tested during normal operation. This is a very expensive way to improve the performance of the first stage vane because of the high costs to cast and machine the new vane. If the new vane has little or no improvement in the engine, then the cost of the redesign and casting is a loss.

BRIEF SUMMARY OF THE INVENTION

A turbine vane for a first or second stage industrial gas turbine engine, where the vane includes an inner spar or insert that forms a series of impingement cooling passages to cool the airfoil walls. The insert is formed from a stack of layers that are bonded together to form the cooling air passages. A first layer provides impingement cooling to a forward section on the pressure wall side followed by impingement cooling of the aft section of the pressure wall side of the airfoil. The spent cooling air from the aft section of the pressure wall side is then split up into two flows with one flow producing impingement cooling to the aft section of the suction wall side which is then discharged through the trailing edge region of the airfoil and a second flow that produces impingement cooling on the forward section of the suction wall side which is then discharged through film cooling holes on the leading edge region of the suction side of the airfoil.

The stacked layers that form the serial impingement cooling insert is formed from a metal printing process that can produce very small cooling air features that cannot be formed using current casting processes such as the lost wax or investment casting process.

The turbine stator vane can be a spar and shell construction with separate end walls from the shell and the stacked insert secured within the shell and end wall assembly to form the vane having the serial impingement cooling circuit that the stacked inserts provides for.

In another embodiment of the present invention, an old turbine stator vane can be improved by hollowing out the internal cooling air features to leave a shell of the airfoil with the inner and outer end walls intact, and the serial impingement insert of the present invention can be secured within the hollowed out shell to produce a new and improved stator vane using the old structure without having to produce an entirely new stator vane. The vane is hollowed out and hooks are cut or later welded to the inner surface of the airfoil so that the stacked insert can be secured in place within the airfoil to produce the serial impingement cooling.

A method for forming an insert using a stack of thin metal sheets each having a cooling circuit formed therein is bonded together using a transient liquid phase (TLP) bonding process. The thin metal sheets are made from IN625 and have the small cooling air passages and impingement holes formed using a photo-etching process. IN625 is used because it has a lower melting temperature than the material used for the airfoil. Boron is used between the thin metal sheets for the TLP bonding process so that no materials will seep into the small passages or cooling holes due to the bonding process. The stack of thin metals sheets is placed under pressure during the TLP bonding process so that no gaps are formed between the adjacent layers.

DETAILED DESCRIPTION OF THE INVENTION

A turbine stator vane, especially for a vane used in an industrial gas turbine engine, includes an insert secured within the airfoil section to provide serial impingement cooling for the backside walls of the airfoil. The impingement cooling insert is formed from an alternating stack of plates that form the cooling circuit for the vane airfoil section. The impingement cooling insert can be secured with a shell formed separately from inner and outer endwalls or in a hollowed out airfoil with the endwalls formed as a single piece with the airfoil section.

Figure 2:
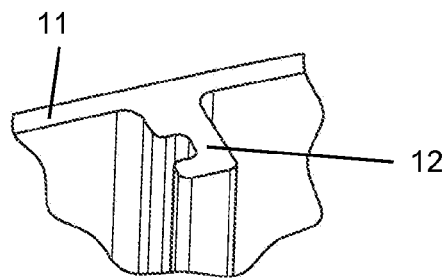
FIG. 2 shows a close-up view of a section of the shell in FIG. 1 with one of the hooks.
Figure 1:
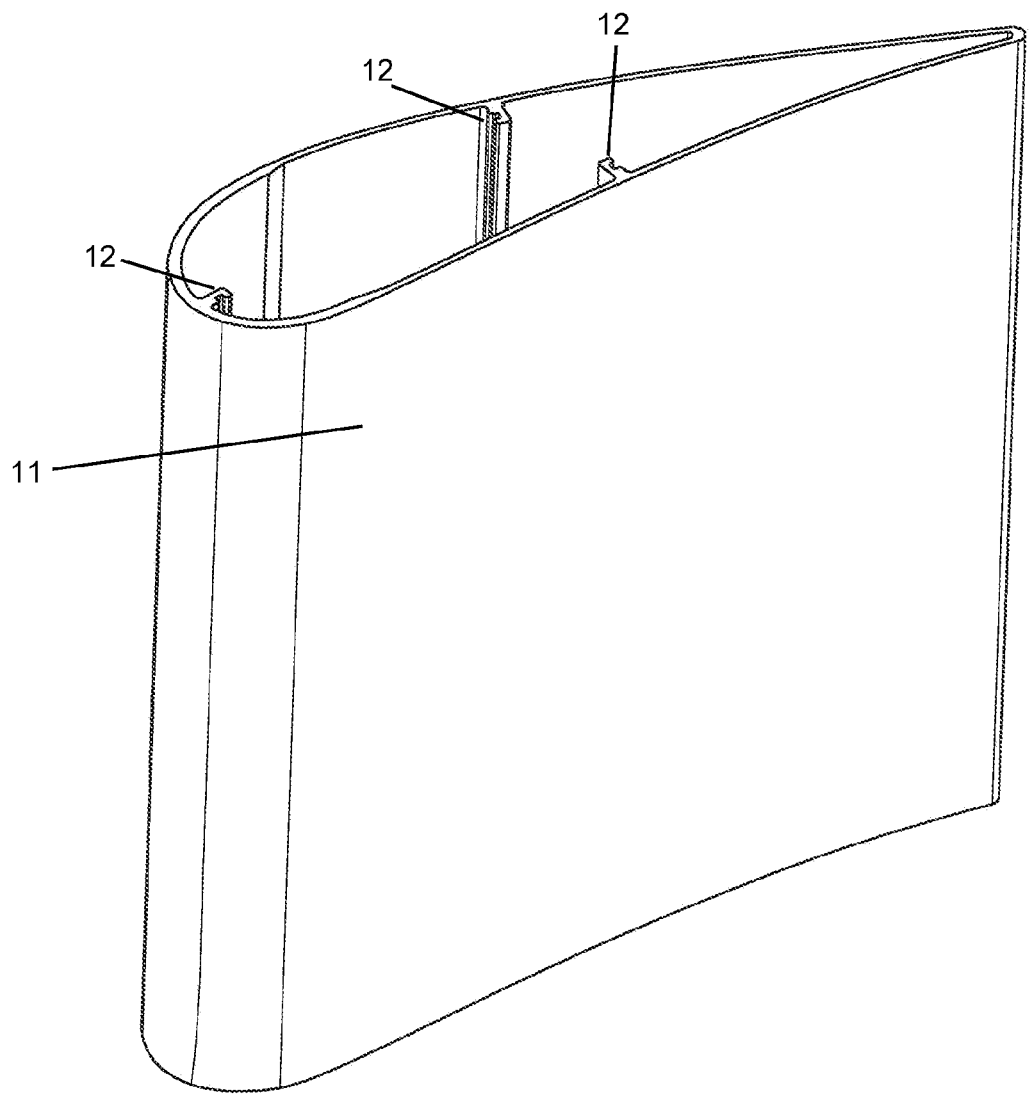
FIG. 1 shows an isometric view of a shell with hooks of the present invention.

FIG. 1 shows a shell 11 that forms the spar and shell type of vane or blade. The shell includes hooks 12 that secure the shell walls to the insert as described below.

Figure 3:
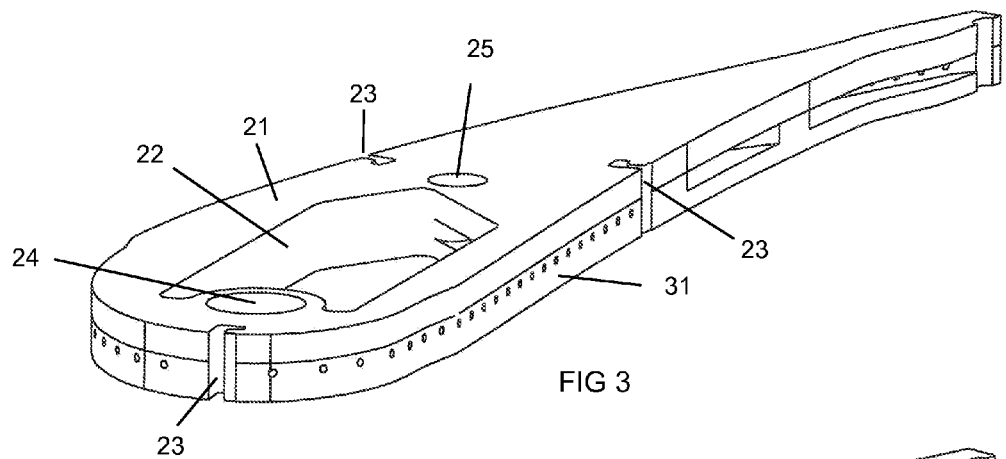
FIG. 3 shows an isometric view of a top layer on an impingement layer of the stacked insert of the present invention.
Figure 4:
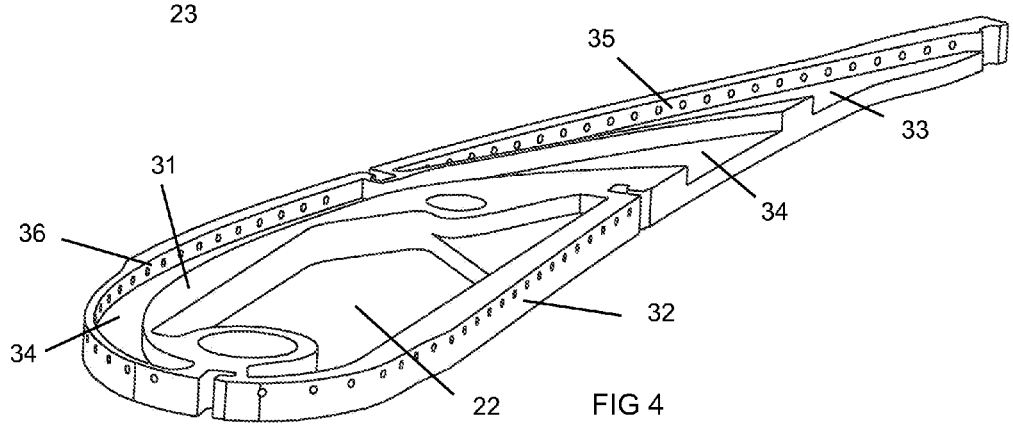
FIG. 4 shows an isometric view of an impingement layer of the stacked insert of the present invention.
Figure 5:
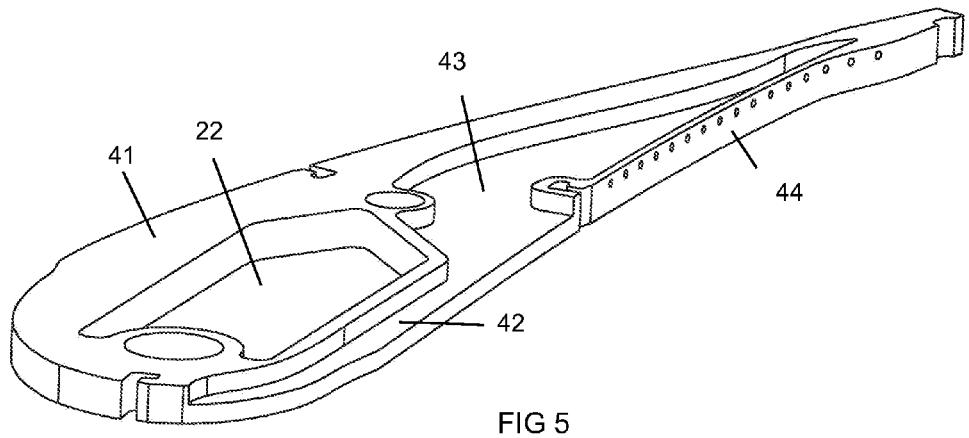
FIG. 5 shows an isometric view of a collection layer of the stacked insert of the present invention.

FIGS. 3 through 5 shows the three plates used to form the insert that produces the impingement cooling for the backside walls of the shell or airfoil section of the vane. The insert is formed with a top layer or plate 21 followed by an alternating arrangement of plate A 31 and plate B 32. FIG. 3 shows a top layer 21 with a plate A below it. The top layer 21 includes a cooling air supply cavity 22, receivers 23 for the hooks from the airfoil, and two holes 24 and 25 that can be used for bolts that secure the stacked plates 21, 31 and 41 together to form the insert. In FIGS. 3 through 5, the thickness or length in the airfoil spanwise direction is exaggerated in order to show the details of the film cooling holes and other features. The actual plates that are used to form the insert would be very thin in order to provide very small spacing between film cooling holes in the spanwise direction. The plates are so thin that the features formed within the plates could not be cast using the investment casting process because of the small size required. Ceramic pieces of this size would be broken during the liquid metal pouring process.

FIG. 4 shows the plate A 31 with a cooling air supply cavity 22 aligned with the cooling air supply cavity in the top plate 21, hook receivers aligned with the hook receivers of the top plate 21, a row of impingement cooling holes 32 located in an forward section of the pressure side wall of the airfoil, a collection and supply channel 33 for an aft section of the suction side wall of the airfoil, a collection and supply channel 34 for a forward section of the suction side wall of the airfoil, a row of impingement cooling holes for the aft section of the suction side wall of the airfoil, and a row of impingement cooling holes for a forward section of the suction side wall of the airfoil.

FIG. 5 shows the plate B 41 with a cooling air supply cavity 22 aligned with the cooling air supply cavities in the top plate 21 and the plate A, hook receivers aligned with the hook receivers of the top plate 21, a pressure side wall spent impingement cooling air collection channel 42, a supply channel 43 for an aft section of the pressure side wall, and a row of impingement holes 44 for the aft section of the pressure side wall.

Figure 6:
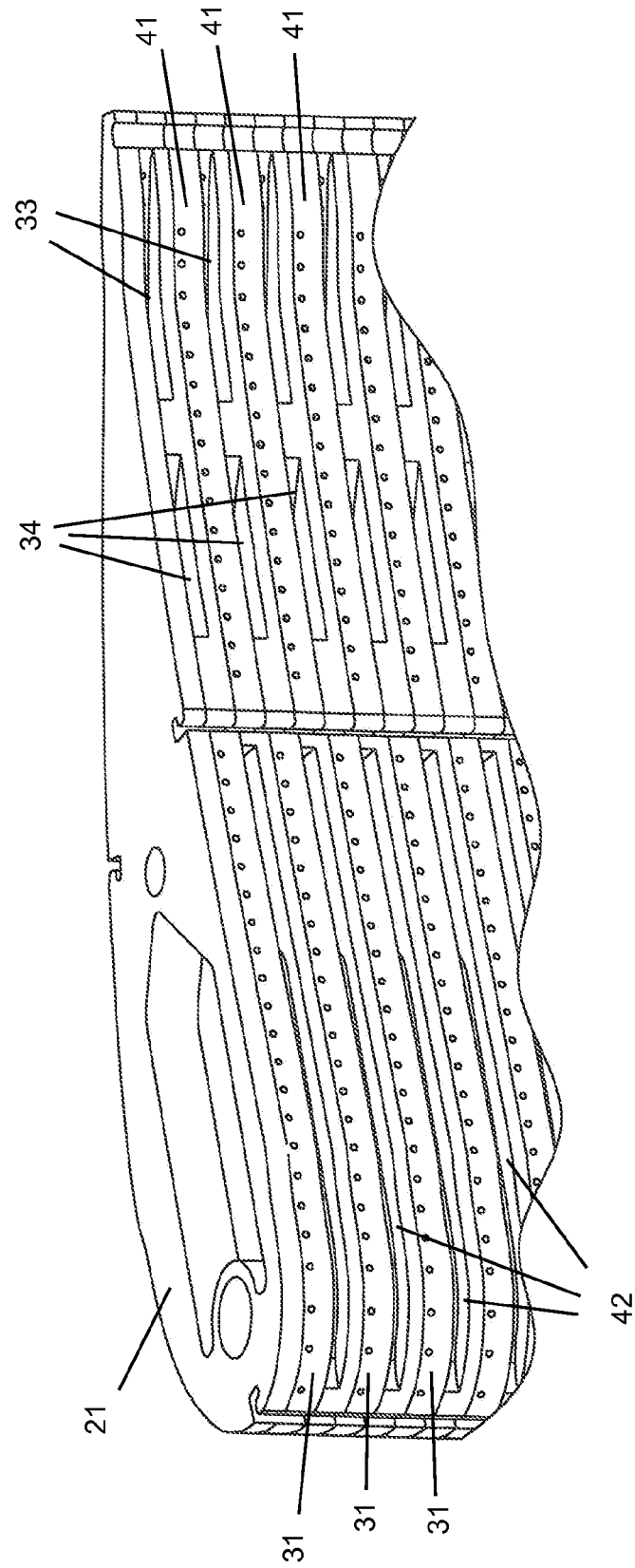
FIG. 6 shows an isometric view of a top section of the stacked inserts of the present invention in assembled formation.

FIG. 6 shows an upper section of the insert with the top plate 21 on top and the alternating arrangement of the plates A and B (31 and 41) stacked below the top plate 21. The collection chambers 33 and 34 for the aft section of the pressure side wall impingement chamber is shown and the collection chamber 42 for the forward section of the pressure side impingement chamber is shown in FIG. 6 formed between the stack of plates 31 and 41. When the plates 31 and 41 are stacked together, a gap is formed between the plates (31 and 41) and the inner side of the airfoil or shell wall for the cooling air to flow toward the wall or away and into the next channel and row of impingement cooling holes. The gaps extend along the spanwise direction of the airfoil and are only separated by the hooks in the chordwise direction. The plates 21, 31 and 41 can be bonded together such as with a TLP (transient liquid phase) bonding process or with bolts that pass through the bolt holes 24 and 25.

Figure 7:
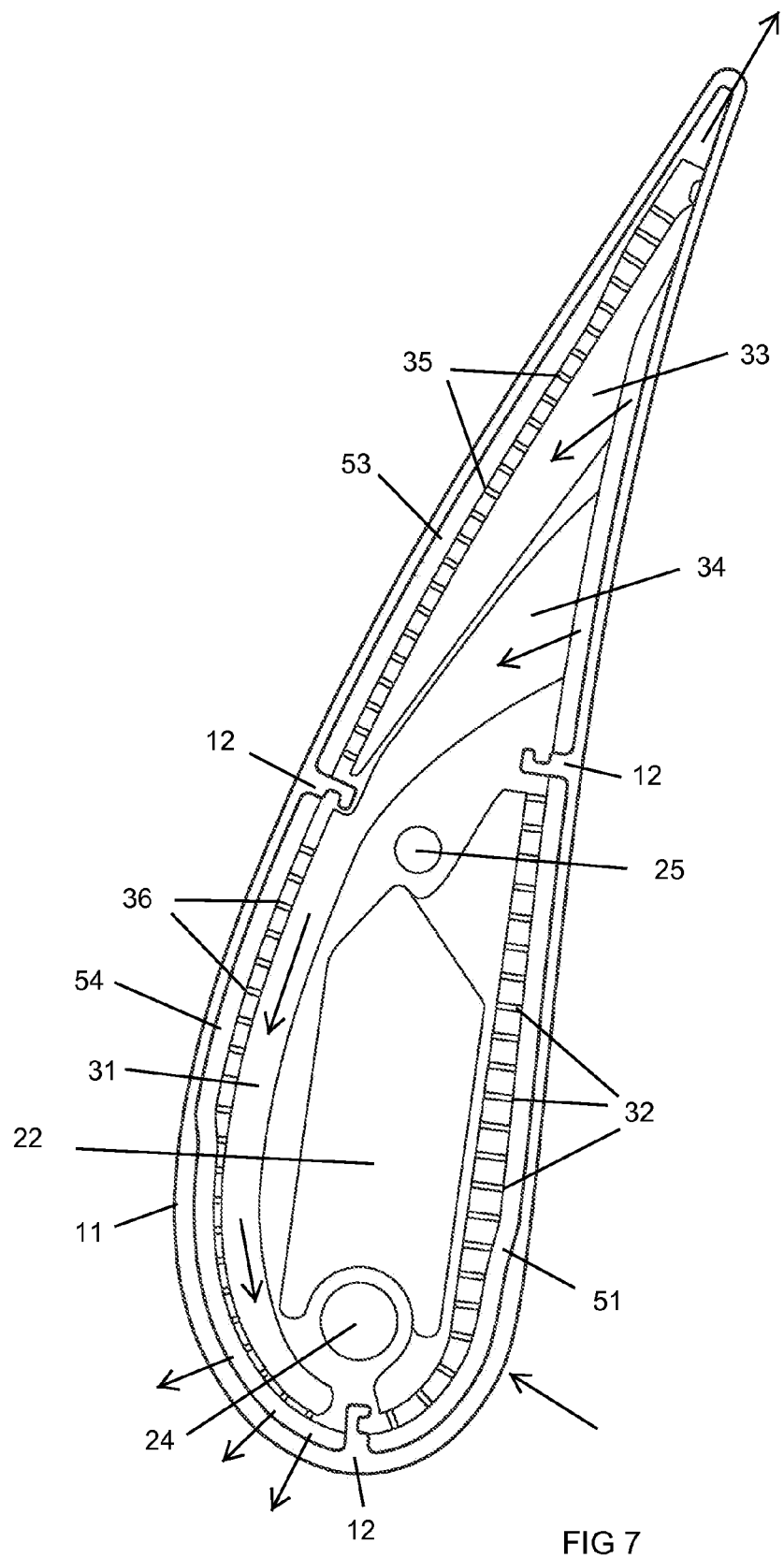
FIG. 7 shows a top view of the impingement layer of the stacked insert of the present invention secured within an airfoil wall.
Figure 8:
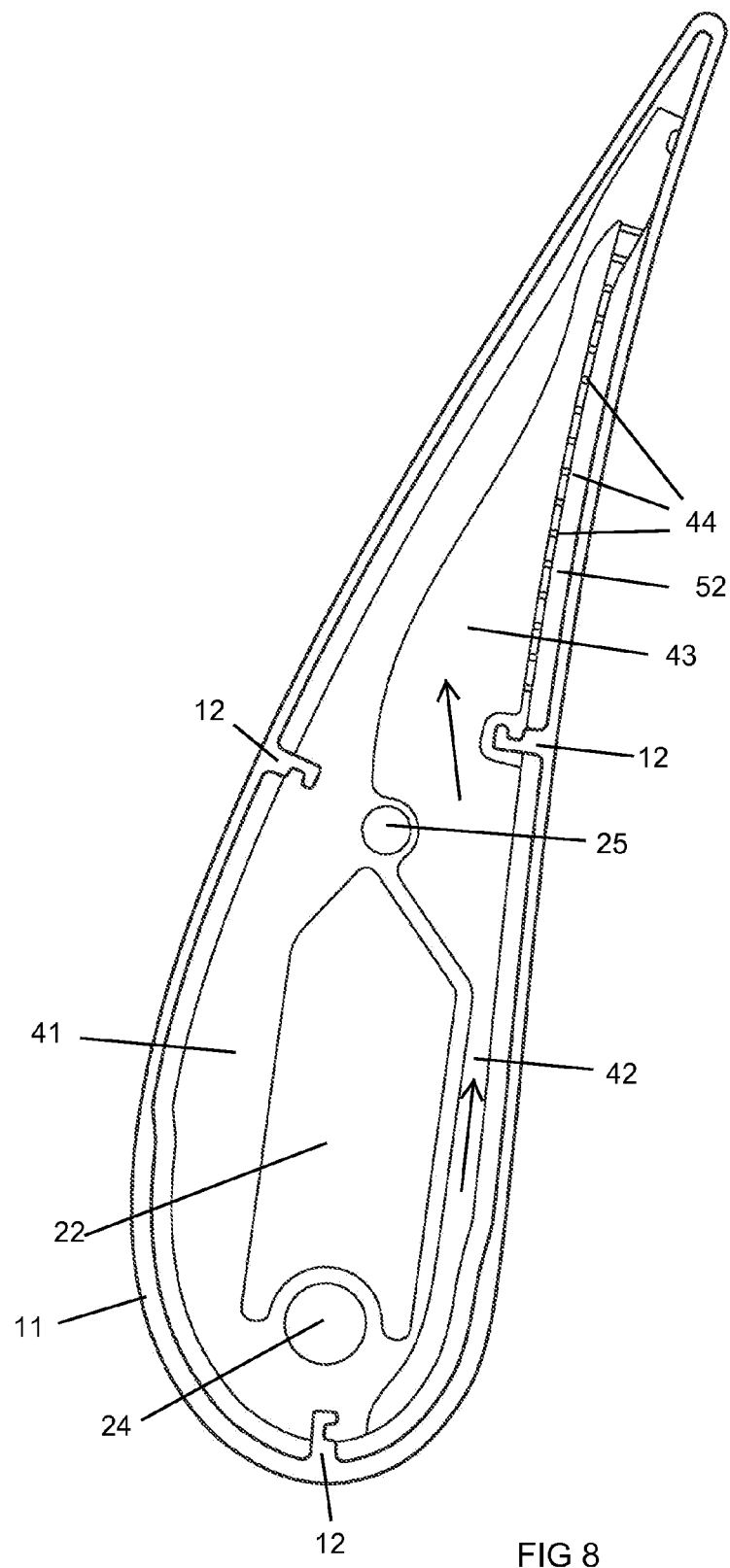
FIG. 8 shows a top view of the collection layer of the stacked insert of the present invention secured within an airfoil wall.

FIGS. 7 and 8 shows the two plates A and B (31 and 41) that form the serial impingement cooling circuit for the airfoil with the plates secured to the hooks that extend from the inner side of the airfoil or shell that forms the vane. In this embodiment of the present invention, three hooks are used that separate the cooling channels for the airfoil into four sections which are the forward pressure side impingement channel or chamber 51 (see FIG. 7), an aft pressure side impingement chamber 52 (see FIG. 8), an aft suction side impingement chamber 53 (FIG. 7), and a forward suction side impingement chamber 54 (FIG. 7). Each of the four impingement chambers 51-54 have about the same chordwise length. However, the four chambers 51-54 can have different chordwise lengths depending upon the cooling requirements of the shell. In this particular embodiment, the insert forms a cooling circuit in which the forward pressure side chamber 51 is cooled first, the spent impingement air collected and passed into the aft pressure side chamber 52 in series with the forward pressure side chamber 51, where the spent impingement cooling air from the aft pressure side chamber 52 is collected and then split up into two channels 33 and 34. Channels 33 and 34 then flow the cooling air to the aft suction side impingement chamber 53 and the forward suction side impingement chamber 54 in parallel to provide impingement cooling to the suction side wall of the airfoil or shell. The spent impingement cooling air from the aft suction side impingement chamber is channeled out through exit holes formed along the trailing edge of the shell or airfoil. The spent impingement cooling air from the forward suction side impingement chamber 54 is channeled out through film cooling holes formed in a leading edge region of the shell or airfoil on the suction side.

When all of the plates are stacked together to form the insert, a series of impingement cooling circuits are formed that extend along the spanwise or radial direction of the insert. Each of the impingement cooling circuits that form the series includes the four impingement cooling chambers 51-54 as described in FIGS. 7 and 8. The three hooks separate the four impingement chamber 51-54 in the chordwise direction. The plates 21, 31, and 41 are all recessed within the shell so that a gap is formed between the outer side of the plates and the inner surface of the shell. In the forward pressure side impingement chamber 51, each of the impingement cooling holes 32 in the plate 31 and the return chamber 42 in the plate 41 are connected to the gap formed between the plates and the inner side of the shell formed between the two hooks and extend from the platform to the blade tip. All of the impingement cooling air discharged into this gap can flow back into any one of the return chambers 42 formed in any one of the plates 41 because the gap is open to all of the impingement holes 32 and return chambers 42. The same open gap is formed with the other three impingement chambers 52-54.

As seen in FIG. 4, the cooling air flows through the impingement holes 32 to produce impingement cooling for the forward section of the pressure side wall. The spent impingement cooling air is then collected in the chamber 42 formed by the plate 41 shown in FIG. 5. The spent impingement cooling air is then channeled through channel 43 to the impingement holes 44 to produce impingement cooling for the aft section of the pressure side wall. The spent impingement cooling air from the impingement holes 44 is then channeled through channels 33 and 34 toward the two impingement chambers on the suction side wall. The spent impingement cooling air from the impingement holes 35 is channeled in the chamber formed between the airfoil inner surface and the insert to the trailing edge exit holes. The spent impingement cooling air from the impingement holes 36 is channeled in the chamber formed between the airfoil inner surface and the insert to the leading edge film cooling holes.

The separate plates are bonded together using a process such as Transient Liquid Phase (TLP) bonding, or by mechanical fasteners. The impingement cooling holes and the cooling circuit formed on the plates are of very small size that cannot be formed using the lost wax or investment casting process. Thus, the plates must be formed using a process such as that developed by Mikro Systems, Inc. of Charlottesville, Va. that can print metallic and ceramic parts as a single piece with very fine details that cannot be produced using the prior art investment casting process. Other processes can also be used but with less detail such as machining, casting, photoetching and electric discharge machining or EDM. Each of the plates 21, 31 and 41 can be printed as a separate piece and then bonded together using the TLP bonding process. If the impingement cooling holes and other cooling air passages or features of the plates can be formed by investment casting process, then the entire insert can be formed as a single piece without using the stacked plates that are bonded together. The reason for using the stacked plates that are bonded together is because the fine cooling air features used in the one embodiment of the present invention that cannot be cast using the investment casting process because of the casting limitations such as with the ceramic core.

Figure 9:
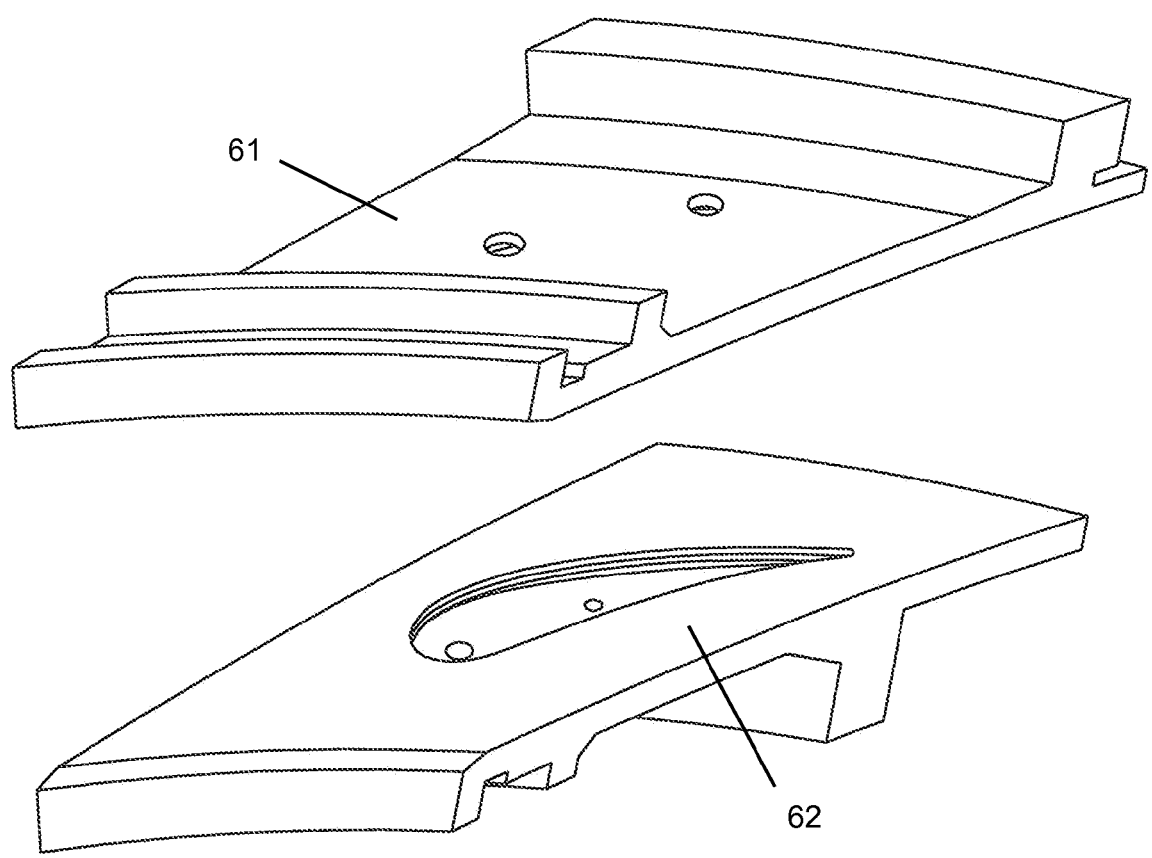
FIG. 9 shows the outer and inner end walls used to form the vane of the present invention.
Figure 10:
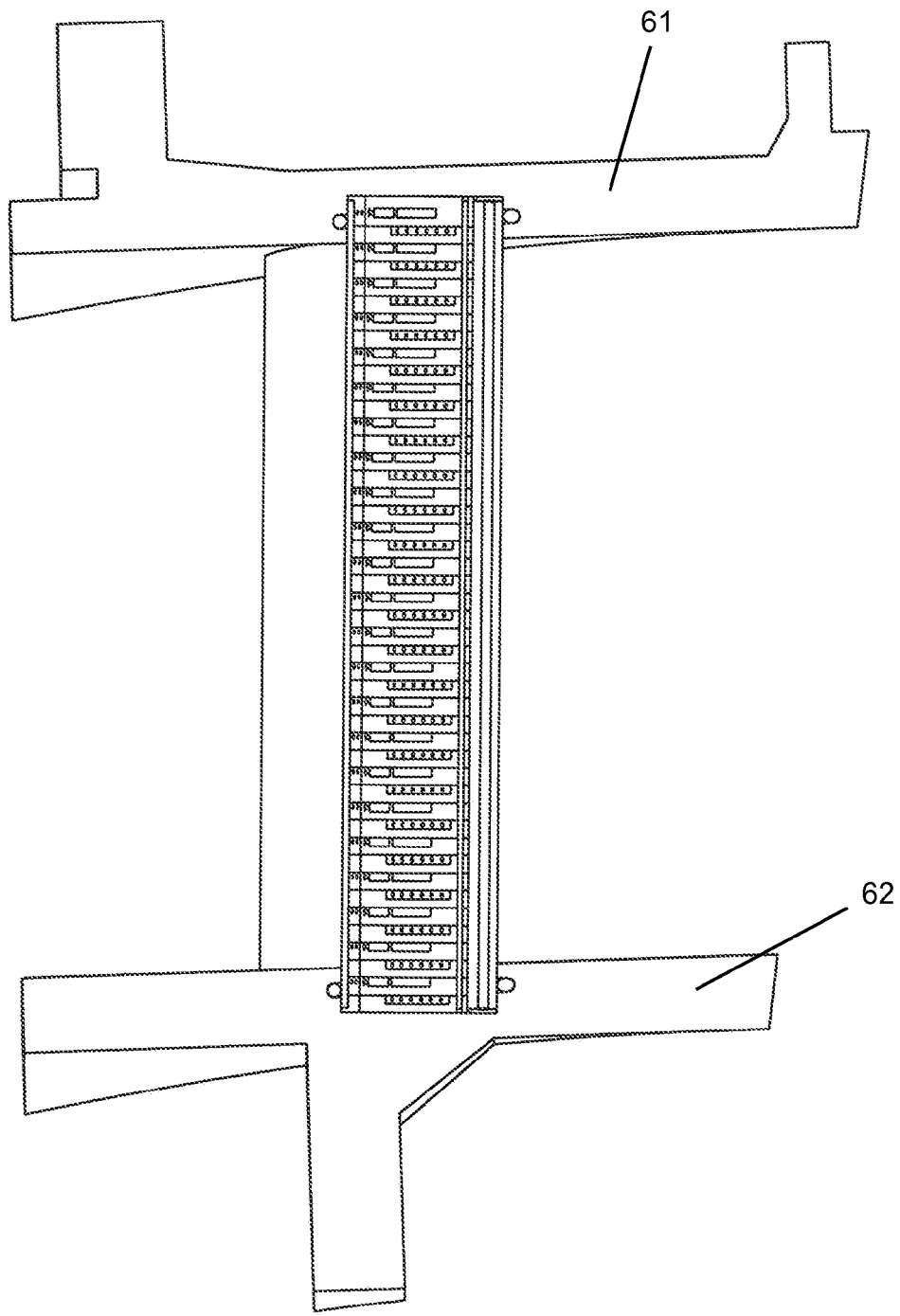
FIG. 10 shows a cross section side view of a stator vane with a stacked insert for serial impingement cooling of the present invention.
Figure 11:
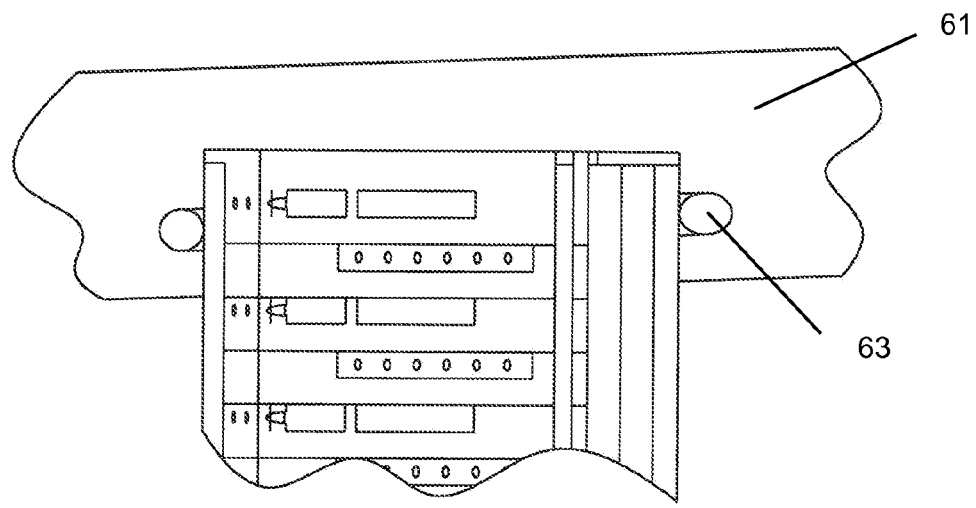
FIGS. 11 and 12 shows cross section views of the upper section and the lower section of the stacked insert of the present invention.
Figure 12:
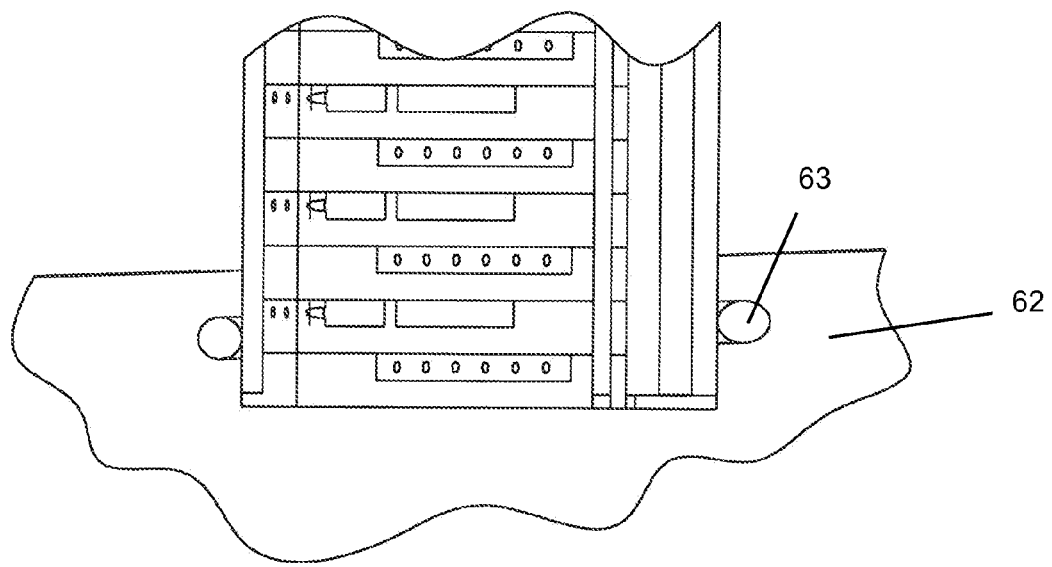
Figure 13:
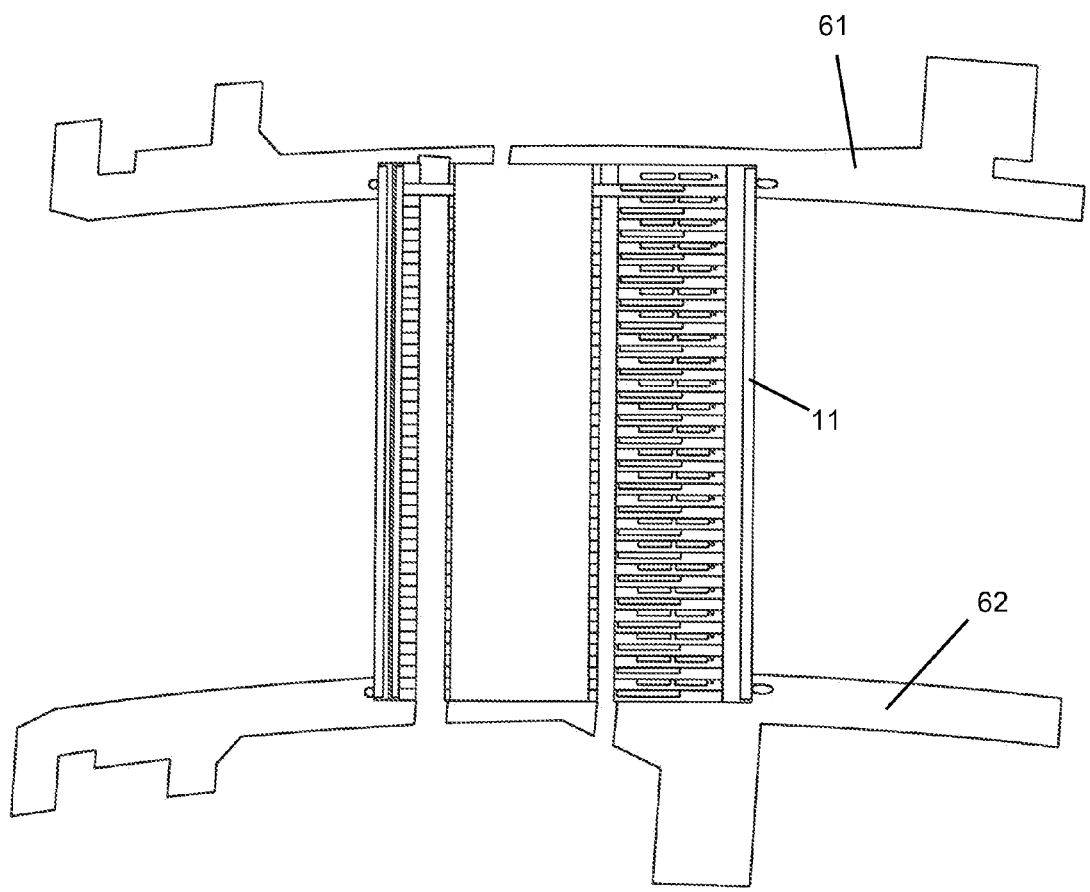
FIG. 13 shows a cross section view of a spar and shell vane with separate end walls having the stacked insert of the present invention.

FIG. 9 shows an outer end wall 61 and an inner end wall 62 used to form the stator vane. A shell forming the airfoil section is secured between the two end walls 61 and 62 with the insert formed from the stacked plates secured within the shell and between the endwalls. FIG. 10 shows the shell secured between the two endwalls 61 and 62 in a thermally free state and with rope seals (preferably made from Nextel) providing a seal between the end wall and the shell. FIGS. 11 and 12 shows the outer end wall 61 and the inner end wall 62 with rope seals 63 to secure the gap formed between the shell and the end wall. The insert is secured within the shell and the endwalls. FIG. 13 shows outer and inner endwalls 61 and 62 with the shell 1 secured between them in a thermally free state and the insert formed from the stacked plates secured within the shell and between the endwalls.

Figure 14:
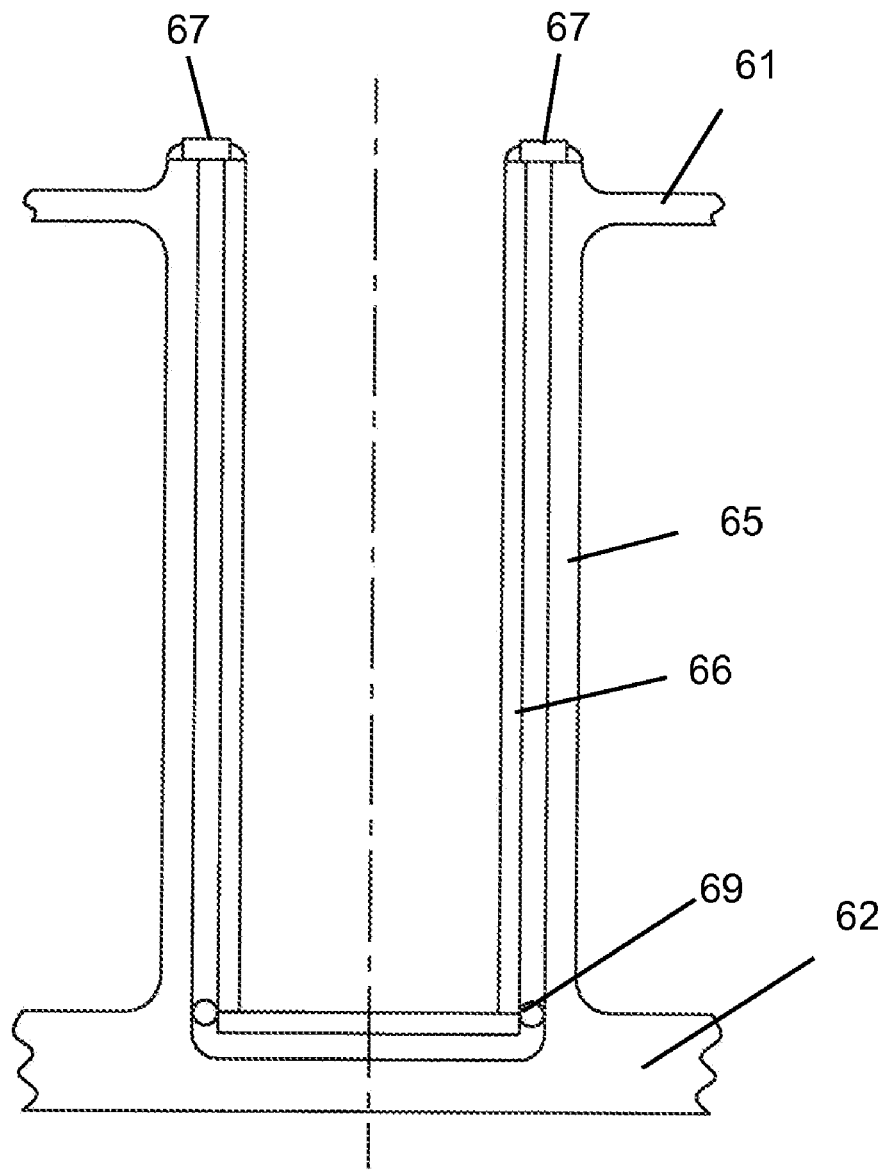
FIG. 14 shows a cross section view of one method of securing the stacked insert within an airfoil of the present invention.

In another embodiment of the invention, an old vane can be improved by hollowing out the interior cooling air passages and securing the insert of the present invention formed from the stacked plates to provide for backside wall impingement cooling of the airfoil surface of the old vane. The old vane with its two endwalls can be machined to leave a hollow space within the airfoil walls in which the insert formed from the stacked plates can be then secured. FIG. 14 shows an embodiment in which a vane having an outer end wall 61 and an inner end wall 62 and an airfoil surface 65 is hollowed out and the insert formed from the stacked plates 66 is secured by welding a plate 67 that covers over the top ends of the outer end wall 61 and the insert 66. One or more seals 69 are placed around the lower end between the insert and the hollowed out interior of the airfoil 65. The upper end of the insert is secured to the hollow section of the vane by the weld 67 while the inner diameter end is slip fitted between the insert and the vane. This allows for the insert and the vane to expand relatively due to thermal growth without inducing any stresses. With this embodiment, the old vane can be tested with various different cooling circuits by using different inserts formed from stacked plates until a desired amount of cooling capability is found without having to recast a new vane having the newly designed cooling circuit.

One method of manufacturing the sequential impingement insert of the present invention is described below. The plates 21, 31 and 41 that are used to form the insert can be formed from thin sheets of a metal such as IN625 in order to form the insert with the lowest cost. Using IN625 requires no stress relief due to the bonding process, meets required temperature limits for use in a turbine airfoil, provides reasonable oxidation and good anti-corrosion capability, will allow for TLP bonding, can be used as thin sheets as defined by the cavity spacing of the insert, can be made thick enough for easy handling, and can be thin enough to bend for bonding.

Each of the thin metal plates are formed from a thin metal stock and photo etched to form the cooling air features such as the passages and the impingement cooling holes. Photo-etching is low cost, provides for precision shapes, allows for low cost tooling to form the plates, can produce extremely fine features, and will allow for several different cooling air configurations in the stack of thin metal plates.

The thin metal plates 21, 31 and 41 are bonded together using a TLP (transient liquid phase) bonding process. A thin sheet (0.0002 in) of Boron is placed between each plate for the TLP bonding process because the Boron will fuse into the plates without leaving any excess material that could seep into the cooling air features formed within the plates. A brazing process uses Silicon or Boron along with another material to bond two surfaces together, but leaves excess material that seeps out from the bonded surfaces. Brazing would not work for the insert of the present invention. The plates 21, 31 and 41 are aligned for the bonding process by using a tool having the shape of the cooling air supply channel 22 to align each plate in a proper position for bonding. The stack of plates is placed under compression during the bonding process so that no gaps are left during the bonding process so that a smooth bonding surface is produced. The thin Boron sheets will be totally diffused into the plate metal material without leaving any excess material.

The insert formed from the stacked plates can be used in a new airfoil that is formed to accommodate the insert, or can be used in an old airfoil that is hollowed out in order to fit the insert inside to provide for impingement cooling of the airfoil walls. The airfoil, such as a turbine stator vane, will have hooks or other members extending from the inner walls that will form a seal between adjacent impingement chambers formed between the insert and the inner airfoil wall. In one embodiment, hooks are used to attach the insert to the hollow airfoil inner surfaces. In another embodiment, a tongue and groove arrangement can be used. The airfoil can have radial extending grooves formed on the inner surface of the walls in which tongues extending out from the plates will slide into and form the seals that will also position the insert within the airfoil. If an old vane is used, the vane is hollowed out and the radial extending grooves are machined into the inner walls to accommodate the insert.

For a highly twisted airfoil, the insert must also be twisted in order to provide adequate impingement cooling to the airfoil walls. If the airfoil is not highly twisted, then the insert can be bonded together outside of the airfoil and then placed into the airfoil by inserting the insert with a slight rotation. For a highly twisted airfoil in which a bonded insert cannot be inserted inside the hollow airfoil, the insert can be bonded together inside of the airfoil. In this embodiment, the individual plates can be inserted into the hollow airfoil and stacked in place, and then the plates can be bonded together inside the airfoil. The individual plates can be separately inserted into the airfoil and then bonded together, or a number of small stacks of inserts can be bonded outside of the airfoil and then placed inside the airfoil in the proper locations and then bonded together to form the single piece insert. Boron sheets or material is placed between each surface that is to be bonded together. The airfoil with the plates inserted into place can be heated in a furnace to bond the plates together. A plug can be placed between the plates and the bottom of the hollow airfoil to support the plates from the bottom end, and a weight can be placed on the top plate to push the plates together during the bonding process. If the required bonding temperature is too high for the metal airfoil, then a lower temperature bonding material can be used or the plates made out of a different material with a lower bonding temperature.

We claim the following:

1. A method of forming a sequential impingement cooling insert for a turbine airfoil comprising the steps of:
    forming a plurality of sheets having an airfoil shape;
    photo-etching the plurality of sheets to form plates that form a sequential impingement cooling circuit;
    placing Boron between adjacent plates;
    compressing the plates together with the plates in position for bonding; and,
    securing the plates together using a transient liquid phase bonding process.

2. The method of forming a sequential impingement cooling insert of claim 1, and further comprising:
    forming the sheets from IN625 sheet metal.

3. The method of forming a sequential impingement cooling insert of claim 1, and further comprising the step of:
    forming the insert from an alternating formation of an upper plate and a lower plate that together form the sequential impingement cooling circuit that provides impingement cooling to a backside surface of the airfoil walls.

4. The method of forming a sequential impingement cooling insert of claim 1, and further comprising the step of:
    the Boron is a sheet of Boron with a thickness of about 0.0002 inches.

5. The method of forming a sequential impingement cooling insert of claim 3, and further comprising the step of:
    forming the plates with a plurality of insert securing members that also form seals to separate adjacent impingement cavities.

6. The method of forming a sequential impingement cooling insert of claim 1, and further comprising the steps of:
    forming the insert from a series of upper and lower plates with the upper plates having a first row of impingement cooling holes in a forward pressure side section of the airfoil, a third row of impingement cooling holes in a forward suction side section of the airfoil, and a fourth row of impingement cooling holes in an aft suction side section of the airfoil; and,
    forming the lower plates with a second row of impingement cooling holes in an aft pressure side section of the airfoil and a forward pressure side collection channel connected to the second row of impingement holes.

7. The method of forming a sequential impingement cooling insert of claim 1, and further comprising the steps of:
    forming the plates with a cooling air supply channel in a forward section of each plate that also forms a passage to align the plates in position for bonding.

8. A method of forming an air cooled turbine airfoil having impingement cooling of the airfoil walls, the method comprising the steps of:
    forming an airfoil with a hollow inner section such that the airfoil walls can be cooled using impingement cooling air;
    forming a plurality of inserting securing members on the hollow inner section of the airfoil;
    forming an insert from a plurality of plates that are bonded together to form a sequential impingement cooling circuit to produce impingement cooling on a forward section and an aft section of a pressure side wall and a suction side wall of the airfoil;
    securing the insert inside the hollow inner section of the airfoil.

9. The method of forming an air cooled turbine airfoil of claim 8, and further comprising the steps of:

obtaining an old airfoil; and, hollowing out the old airfoil by removing an existing internal cooling air circuit from the airfoil.

10. The method of forming an air cooled turbine airfoil of claim 8, and further comprising the steps of:

forming the insert from a plurality of plates made from IN625; and, bonding the inserts together with a sheet of boron between adjacent plates using a transient liquid phase bonding process.

11. The method of forming an air cooled turbine airfoil of claim 8, and further comprising the steps of:

photo-etching a sequential impingement cooling circuit within the plates prior to bonding the plates together.

12. A method of forming a highly twisted air cooled turbine airfoil having impingement cooling of the airfoil walls, the method comprising the steps of:

forming a highly twisted airfoil with a hollow inner section such that the airfoil walls can be cooled using impingement cooling air;

forming a plurality of alternating plates having an airfoil shape that forms a sequential impingement cooling circuit for the airfoil walls when bonded together;

placing the plurality of plates within the hollow inner section of the airfoil with a bonding agent between adjacent plates; and, bonding the plurality of plates to form a single piece insert while the plates are inside the airfoil hollow inner section.

13. The method of forming a highly twisted air cooled turbine airfoil of claim 12, and further comprising the step of:

compressing the plurality of plates together prior to the bonding process.

14. The method of forming a highly twisted air cooled turbine airfoil of claim 12, and further comprising the step of:

forming the plates from IN625.

15. The method of forming a highly twisted air cooled turbine airfoil of claim 12, and further comprising the step of:

using Boron as the bonding agent.

16. The method of forming a highly twisted air cooled turbine airfoil of claim 12, and further comprising the steps of:

bonding several small stacks of plates together outside of the airfoil;

placing the small stack of bonded plates inside the hollow inner section of the airfoil with a bonding agent between adjacent small stacks of bonded plates; and, bonding the small stacks of bonded plates together to form a single piece insert.

17. The method of forming a highly twisted air cooled turbine airfoil of claim 12, and further comprising the steps of:

compressing the small stacks of bonded inserts together prior to bonding.

18. A plate used to form an insert that provides sequential impingement cooling for a backside surface of a turbine airfoil, the plate comprising;

the plate has an airfoil shape with a leading edge region and a trailing edge region with a pressure side surface and a suction side surface extending between the edges;

three insert retaining and seal forming members located on the pressure side surface and the suction side surface and the leading edge region of the plate;

a first row of impingement cooling holes located along a forward section on the pressure side surface of the plate;

a second row of impingement cooling holes located along a forward section on the suction side surface of the plate;

a third row of impingement cooling holes located along an aft section on the suction side surface of the plate;

a cooling air supply channel located in a forward section of the plate and connected to the first row of impingement cooling holes;

a first cooling air passage located in the aft section on the pressure side surface of the plate and connected to the second row of impingement cooling holes; and, a second cooling air passage located in the aft section on the pressure side surface of the plate and connected to the third row of impingement cooling holes.

19. The plate of claim 18, and further comprising:

a plate alignment hole formed within the plate.

20. The plate of claim 18, and further comprising:

the plate is formed from a thin sheet of IN625.

21. The plate of claim 18, and further comprising:

the impingement cooling holes are photo-etched into the plate.

* * * * *

UNITED STATES PATENT AND TRADEMARK OFFICE
CERTIFICATE OF CORRECTION

PATENT NO. : 8,167,537 B1
APPLICATION NO. : 13/298379
DATED : May 1, 2012
INVENTOR(S) : William L. Plank, James P. Downs and John A. Fedock Page 1 of 1

It is certified that error appears in the above-identified patent and that said Letters Patent is hereby corrected as shown below:

In the Specification

Column 1, line 12 should read as follows:

This invention was made with Government support under contract number DE-FE0006696 awarded by Department of Energy. The Government has certain rights in the invention.

Signed and Sealed this
Thirtieth Day of December, 2014

Michelle K. Lee
*Deputy Director of the United States Patent and Trademark Office*